(12) United States Patent
Schell

(10) Patent No.: US 12,517,981 B2
(45) Date of Patent: Jan. 6, 2026

(54) AUTOMATIC ANOMALY THRESHOLDING FOR MACHINE LEARNING

(71) Applicant: ServiceNow, Inc., Santa Clara, CA (US)

(72) Inventor: Lorne Schell, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 987 days.

(21) Appl. No.: 17/590,489

(22) Filed: Feb. 1, 2022

(65) Prior Publication Data

US 2023/0244754 A1 Aug. 3, 2023

(51) Int. Cl.
  *G06F 18/214* (2023.01)
  *G06F 18/21* (2023.01)
  *G06F 18/2433* (2023.01)

(52) U.S. Cl.
  CPC ........ *G06F 18/2155* (2023.01); *G06F 18/217* (2023.01); *G06F 18/2433* (2023.01)

(58) Field of Classification Search
  CPC . G06F 18/2155; G06F 18/217; G06F 18/2433
  See application file for complete search history.

(56) References Cited

U.S. PATENT DOCUMENTS

| | | | |
|---|---|---|---|
| 2019/0130659 A1* | 5/2019 | Ide | G07C 5/006 |
| 2021/0026722 A1* | 1/2021 | Bhatia | G06F 11/079 |
| 2021/0342586 A1* | 11/2021 | Fleisig | G06V 10/457 |
| 2022/0391724 A1* | 12/2022 | Yoon | G06N 5/04 |

* cited by examiner

*Primary Examiner* — Grace Park
(74) *Attorney, Agent, or Firm* — McDonnell Boehnen Hulbert & Berghoff LLP

(57) ABSTRACT

A program is provided to automatically train using a training dataset a machine learning model for detecting anomalies. The machine learning model is automatically applied to a validation dataset to determine anomaly detection results. A histogram of the anomaly detection results of the machine learning model is automatically generated. The histogram is automatically analyzed, and a first peak and a second peak of the histogram is automatically identified. A threshold activation of the machine learning model is automatically determined based at least in part on the automatically identified second peak of the histogram.

19 Claims, 8 Drawing Sheets

AUTOMATIC ANOMALY THRESHOLDING FOR MACHINE LEARNING

BACKGROUND OF THE INVENTION

Anomaly detection can be used to detect events that fall outside a standard trend. The detected deviation or outlier incident can be an indicator that an error, failure, defect, or suspicious event has occurred. When an anomaly has been detected, typically an operations team is notified of the incident and may be assigned to investigate and address the underlying cause. Common uses for anomaly detection include data cleaning, intrusion detection, fraud detection, system health monitoring, and ecosystem disturbances.

BRIEF DESCRIPTION OF THE DRAWINGS

Various embodiments of the invention are disclosed in the following detailed description and the accompanying drawings.

DETAILED DESCRIPTION

Figure 1:
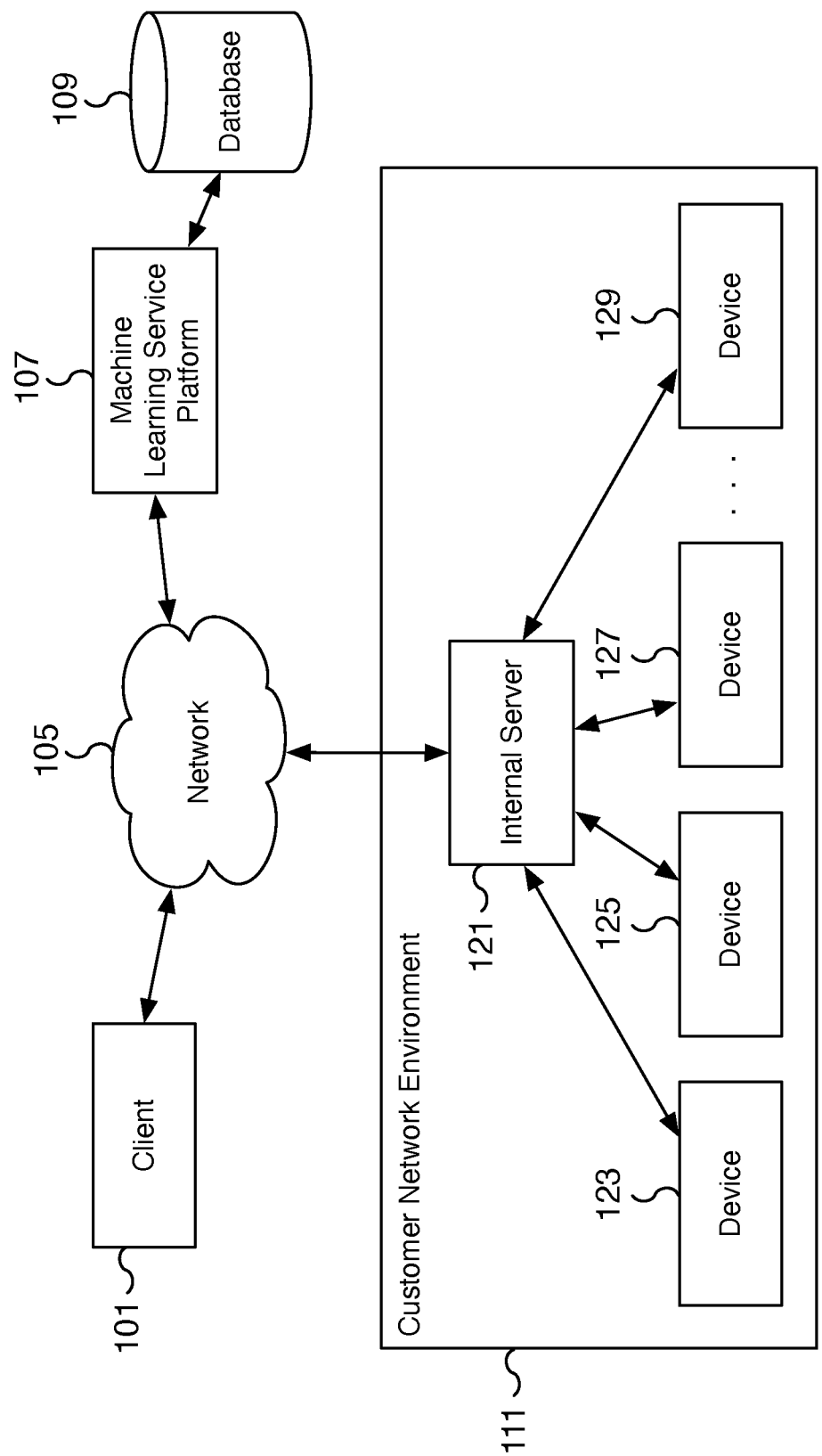
FIG. 1 is a block diagram illustrating an example of a network environment for automatically training a machine learning model with a corresponding anomaly threshold for detecting anomalies.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic anomaly thresholding is disclosed. Using the disclosed techniques, a machine learning model can be trained using unsupervised learning to predict normality scores for a network computer environment. Along with the trained model, an anomaly threshold value is automatically determined wherein predicted normality scores that exceed the determined anomaly threshold value are used to detect an anomaly. In the disclosed embodiments, data associated with the network computer environment is gathered and used by a machine learning service to train a machine learning model to predict normal behavior represented as a predicted normality score. The trained model is applied to a time series of input feature data and corresponding normality scores are predicted. The predicted normality scores are arranged as a histogram to identify modes within the predicted values. For example, the predicted scores can be binned into discrete buckets and arranged as a histogram by increasing normality scores. The leftmost values of the histogram represent normal behavior. As the values increase to the right of the histogram, the values represent increasingly non-normal behavior. In various embodiments, the histogram of predicted normality scores is multimodal. The leftmost mode of the histogram represents largely normal behavior and among the identified modes has the lowest normality score. The second leftmost mode represents common occurrences of anomalies that should be detected. Using the second leftmost mode, an anomaly threshold value is determined. For example, an anomaly threshold value is set to a normality score value slightly less than the score of the peak corresponding to the second leftmost mode. By comparing predicted normality scores to the determined anomaly threshold value, the trained model can be used to identify anomalies as they occur. For example, predicted normality scores that exceed the anomaly threshold value correspond to detected anomalies.

In some embodiments, once the machine learning model is trained and an anomaly threshold value is determined, the trained model is used to detect anomalies in a training dataset. The detected anomalies are removed from the training dataset to create a revised and reduced training dataset that better represents normal system behavior. The model is then retrained using the revised dataset that has detected anomalies removed. A new anomaly threshold value can be determined using the new model. In various embodiments, the model can be continuously revised as appropriate to improve the precision and accuracy of anomaly detection. For example, newly and more current data can be gathered and used to retrain the model. Similarly, operator feedback related to predicted anomalies and/or actual anomalies can be used to revise the trained model.

In some embodiments, a program to automatically train a machine learning model for detecting anomalies using a training dataset is provided. For example, data is gathered from a network computing environment. The gathered data can include operating data such as hardware, software, and user performance data. Once gathered, the data is presented to a machine learning service as unlabeled training data. The machine learning service operates a machine learning training program to train a machine learning model to predict a score that represents whether the network computing environment is operating normally. In some embodiments, the normal operating behavior of a network computer environment corresponds to a valid operating status of the network computer environment. For example, no hardware or software subsystems of the network computer environment are generating faults, operating issues, or critical warnings. In some embodiments, the machine learning model is automatically applied to a validation dataset to determine anomaly detection results. For example, the trained model is applied to a validation dataset representing a time series of data to infer predicted normality scores or anomaly detection results. A histogram of the anomaly detection results of the machine learning model is automatically generated. For example, the predicted normality scores corresponding to the anomaly detection results are binned into discrete buckets and arranged as a histogram by increasing normality score. The leftmost values of the histogram represent normal behavior. As the values increase to the right of the histogram, the values represent increasingly non-normal behavior.

In various embodiments, the histogram is automatically analyzed and a first peak and a second peak of the histogram is automatically identified. For example, the histogram of predicted normality scores is multimodal and includes multiple peaks corresponding to multiple modes where the different modes may have different (nonequal) values. The first and leftmost peak of the histogram represents largely normal behavior. The second peak (and second leftmost peak) represents common occurrences of anomalies that should be detected. In various embodiments, the different peaks correspond to different local maxima of the anomaly detection results histogram. Based at least in part on the automatically identified second peak of the histogram, a threshold activation of the machine learning model is automatically determined. For example, a threshold activation value for detecting anomalies is determined by setting the threshold activation value based on the normality score associated with the second peak. In some embodiments, the threshold activation value is set to a normality score value slightly less than that of the score of the second peak using a configured offset value. By setting the threshold activation value to slightly less than the value corresponding to the second peak, the automatically determined threshold activation value when applied to normality scores predicted using the trained model allows for the detection of the anomalies associated with a network computing environment when the system experiences conditions similar to those represented by the second peak of the histogram.

FIG. 1 is a block diagram illustrating an example of a network environment for automatically training a machine learning model with a corresponding anomaly threshold for detecting anomalies. In the example shown, client 101, machine learning service platform 107, and customer network environment 111 are connected to network 105. Network 105 can be a public or private network. In some embodiments, network 105 is a public network such as the Internet. In various embodiments, machine learning service platform 107 is a cloud-based machine learning service that utilizes database 109, which is communicatively connected to machine learning service platform 107. In some embodiments, database 109 is part of machine learning service platform 107. Customer network environment 111 includes internal server 121 and multiple customer devices including devices 123, 125, 127, and 129. Client 101 utilizes machine learning service platform 107 to initiate, manage, and/or deploy machine learning services for detecting anomalies associated with customer network environment 111. For example, client 101 allows an operator of customer network environment 111 to remotely manage machine learning services for anomaly detection.

In some embodiments, machine learning service platform 107 provides cloud-based machine learning services including services related to anomaly detection for a network environment such as customer network environment 111. Machine learning service platform 107 can be accessed by network clients (not necessarily shown) that reside within or outside customer network environment 111. For example, in some embodiments, client 101 is located within customer network environment 111. Using machine learning service platform 107, an operator can train and/or deploy a machine learning model for anomaly detection using unsupervised learning. When a trained model is deployed, the machine learning service can identify anomalies and trigger an appropriate response including sending notifications to the appropriate operators of the network and/or automatically reconfiguring the network to account for a detected anomaly.

In various embodiments, machine learning service platform 107 can train a machine learning model to perform anomaly detection at least in part by predicting a normality score for a particular network environment. As part of the machine learning training processes, a threshold activation value is also determined that corresponds to the occurrence of an anomaly for the system. For example, the occurrence of an anomaly is predicted in the event the inferred normality score exceeds the threshold activation value. In various embodiments, machine learning service platform 107 can be utilized to train a custom model and determine a custom threshold activation value for different network environments using unsupervised training on unlabeled data gathered from a network computing system such as customer network environment 111. Customer network environment 111 is but one example of a network environment that can utilize the services offered by machine learning service platform 107. Once trained, the model and deployment parameters including a determined threshold activation value can be stored at database 109. The actual inference using the trained model and determined threshold activation value can be performed at machine learning service platform 107 and/or within customer network environment 111 by an internal server such as internal server 121. In various embodiments, the training process is an iterative process and the machine learning model is revised as needed. For example, an operator can provide feedback on the performance of a machine learning model via machine learning service platform 107. The gathered feedback can be used to improve the model performance. Moreover, machine learning service platform 107 can retrain a machine learning model using additionally gathered input data.

In various embodiments, database 109 provides persistent storage for a customer with respect to various managed machine learning services. Each different customer of machine learning service platform 107 may utilize a different data store mechanism such as different databases, database instances, or database partitions or tables. In some embodiments, database 109 is a configuration management database (CMDB) for providing customer services and storing customer data. For example, database 109 can store customer data related to the network environment including training data and/or other data used to predict anomalies including input features for various machine learning models. In some embodiments, database 109 can store customer configuration information related to managed assets, such as related hardware and/or software configurations.

In some embodiments, customer network environment 111 is an information technology network environment and includes multiple hardware devices including devices 123, 125, 127, and 129, as examples. In various embodiments, the devices of customer network environment 111, such as devices 123, 125, 127, and 129, can run application processes that interact with one another and/or with other computing devices outside of customer network environment 111. In the example shown, internal server 121 is capable of initiating and/or receiving network connections to and/or from each of devices 123, 125, 127, and 129 (as shown by the arrows pointing from/to internal server 121 to/from the respective devices 123, 125, 127, and 129). Using internal server 121, data including operating data of the different devices of customer network environment 111 such as devices 123, 125, 127, and 129 is gathered and used to predict anomalies. For example, internal server 121 can gather operating data from the various devices and provide the data to machine learning service platform 107 for both training and potentially inference. In some embodiments, the inference to predict anomalies is performed at internal server 121. Examples of gathered data can include hardware operating data such as data related to CPU, GPU, networking, memory, storage, and power consumption data as well as software operating data such as data related to active threads/processes, active users, page views, page clicks, bounce rates, churn rates, average order values, connected users, connection times of users, etc. In various embodiments, the data is continually gathered at internal server 121 to predict future events such as an anomaly. In some embodiments, agents and/or other processes are deployed on the various devices such as devices 123, 125, 127, and 129 to collect the input data used for machine learning. For example, a log scanning agent can scan the logged output of a process running on a device and provide the results to internal server 121. As another example, an agent can monitor the operation of a running process, such as data related to memory usage, disk access, and/or threads/processes, and provide the results to internal server 121. In some embodiments, custom data values are gathered by a customer and fed to the machine learning service. For example, one or more custom agents can be deployed within customer network environment 111 to collect data and/or calculate different data properties related to customer network environment 111. The collected data is provided to internal server 121 and/or machine learning service platform 107 as a single unlabeled input feature and/or as a collection of unlabeled input features.

In various embodiments, the components shown in FIG. 1 may exist in various combinations of hardware machines. Although single instances of some components have been shown to simplify the diagram, additional instances of any of the components shown in FIG. 1 may exist. For example, machine learning service platform 107 can include one or more cloud-based servers. Some servers of machine learning service platform 107 may include web application servers, machine learning training servers, and/or machine learning inference servers. As shown in FIG. 1, the various servers are simplified as machine learning service platform 107. Similarly, database 109 may not be directly connected to machine learning service platform 107, may be more than one database, and/or may be replicated or distributed across multiple components. For example, database 109 may include one or more different servers for each customer. For customer network environment 111, additional or fewer devices may exist and some components, such as a firewall and/or gateway device, may exist but are not shown. As another example, client 101 is just one example of a potential client to machine learning service platform 107. In some embodiments, components not shown in FIG. 1 may also exist.

Figure 2:
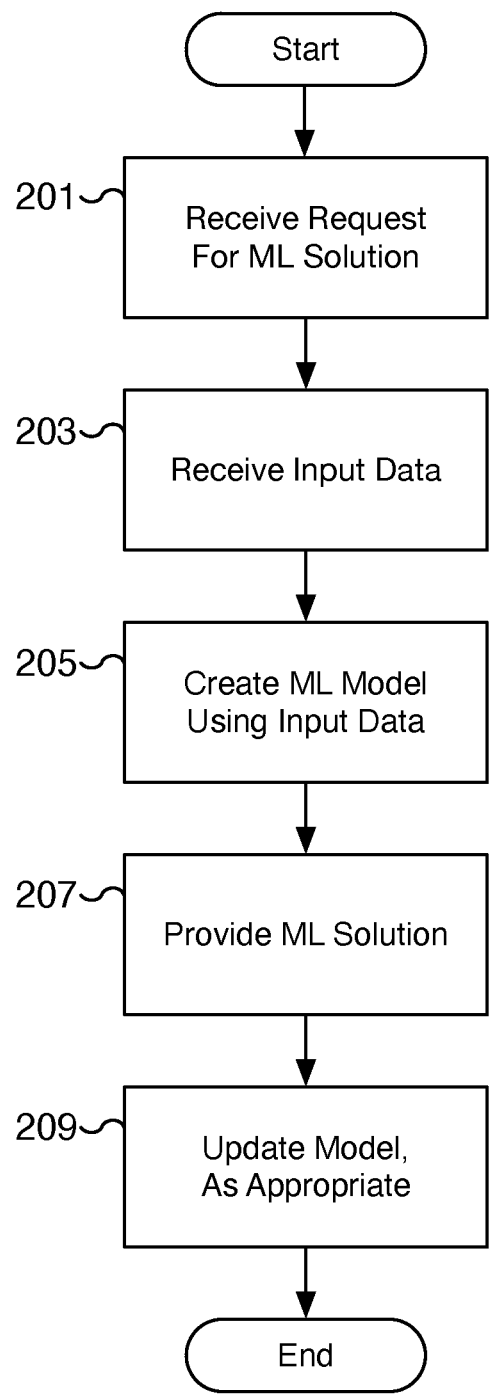
FIG. 2 is a flow chart illustrating an embodiment of a process for creating a machine learning solution for anomaly detection.

FIG. 2 is a flow chart illustrating an embodiment of a process for creating a machine learning solution for anomaly detection. For example, using the process of FIG. 2, an operator can request a machine learning solution for anomaly detection dedicated and customized for a specific network computer environment. The created solution includes both a custom trained machine learning model to predict normality values and a corresponding custom threshold activation value for detecting anomalies. In some embodiments, the machine learning platform for creating the machine learning solution is hosted as a software-as-a-service machine learning service. In some embodiments, an operator requests the solution via a client such as client 101 of FIG. 1 and the system for which anomalies are detected is customer network environment 111 of FIG. 1. In some embodiments, the machine learning platform is machine learning service platform 107 of FIG. 1.

At 201, a request for a machine learning solution is received. For example, an operator via a network client initiates a request for a machine learning solution to a software-as-a-service machine learning service platform. In some embodiments, the user interface for providing the request is a web application. As part of the request, the machine learning service platform receives information on the data that will be provided for training the model. For example, the operator can specify how to receive the data such as what network device will be providing the data and the format of the data.

At 203, input data for machine learning is received. For example, input data to be used as input features for training a machine learning model is received. In various embodiments, the data is gathered at the customer's network computer environment and is specific to the customer's network computer environment. For example, provided data can include real-time and run-time operating values including data related to hardware, software, and user data. Examples of hardware operating values include values related to CPU, GPU, memory, storage, and network operations. Similarly, software operating values can include values related to processes/threads, applications, memory usage including virtual memory usage, idle time, etc. Examples of user data can include data related to active users, page views, page clicks, bounce rates, churn rates, average order values, connected users, connection times of users, etc. In various embodiments, the provided input data is unlabeled and includes a variety of data as determined by the operator. In some embodiments, the input data used for training a machine learning model includes at minimum a month's worth of gathered operating data. By gathering data for at least a month long, the included input data captures at least the monthly cyclical patterns of the network computer environment. In various embodiments, models trained with data that spans at least a month long have significantly improved accuracy and precision.

In some embodiments, custom data values are gathered by a customer and provided to the machine learning service platform as input data. For example, one or more custom agents can be deployed within the customer's network computer environment to collect data and/or calculate different data properties related to the customer's network computer environment. The collected data is provided as a single unlabeled input feature and/or as a collection of unlabeled input features.

At 205, a machine learning model is created using the received input data. For example, a machine learning model is trained using the input data received at 203. In various embodiments, a model is trained using unsupervised training and can be used to predict a normality score. For example, the model is trained to predict a single score that corresponds to how "normal" the perceived operation is of the customer's network computer environment. Based on the normality score, an anomaly activation value is automatically determined. For example, by arranging predicted normality scores as a histogram, peaks can be identified and used to determine a threshold activation value. The automatically determined anomaly activation value is applied as a threshold to predicted normality scores to determine whether an anomaly is detected. For example, a predicted normality score that exceeds the anomaly threshold corresponds to the occurrence of an anomaly for the customer's network computer environment. Additional specific training techniques can be utilized to improve the performance of the model for anomaly detection. For example, in some embodiments, the model is trained over multiple iterations using different generated initial weights. Similarly, in some embodiments, the training of the model can utilize additional reconstruction and/or forecasting techniques. For example, a model can be retrained using input data with predicted anomalies removed and/or retrained by predicting expected behavior and comparing the predictions with actual behavior. Examples of additional or more detailed machine learning training techniques are described with respect to the descriptions of FIGS. 3-8.

At 207, a machine learning solution is provided. For example, the trained model and the automatically determined threshold activation value are provided. In some embodiments, the model is deployed within the customer's network computer environment to detect anomalies using an internal server located inside the customer's network. In some embodiments, the model is deployed as part of a machine learning service and inference is performed by the machine learning service platform using cloud-based machine learning inference servers. In various embodiments, the model is provided with the corresponding anomaly threshold value to allow the customer to predict anomalies for the customer's network computer environment in real-time.

At 209, the machine learning model is updated, as appropriate. For example, the computer network environment may have changed, and newly gathered input data can be used to retrain the model to better reflect current operating conditions. As another example, an operator can provide feedback on the performance of the deployed model that is used to revise the model. For example, an operator can provide feedback on model performance including confirmations of whether detected anomalies correspond to actual anomalies. As part of revising the model, a corresponding threshold activation value can be automatically determined. If a model revision is appropriate, both the updated model and corresponding anomaly threshold value are provided for deployment.

Figure 3:
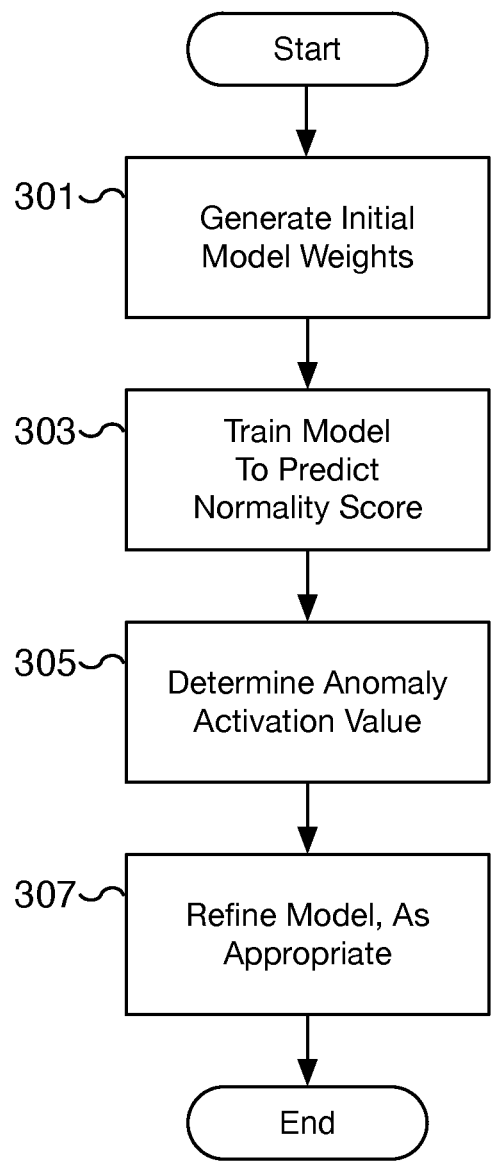
FIG. 3 is a flow chart illustrating an embodiment of a process for training a machine learning model and determining a corresponding anomaly activation value used for anomaly detection.

FIG. 3 is a flow chart illustrating an embodiment of a process for training a machine learning model and determining a corresponding anomaly activation value used for anomaly detection. For example, using the process of FIG. 3, a custom machine learning model is trained to predict normality values and a corresponding custom threshold activation value is automatically determined for detecting anomalies based on a predicted normality score. In some embodiments, the process of FIG. 3 is performed at 205 of FIG. 2. In some embodiments, the process of FIG. 3 is performed by machine learning service platform 107 of FIG. 1. In some embodiments, the model is trained and an anomaly activation value is determined for a network computer environment such as customer network environment 111 of FIG. 1. In some embodiments, the process of FIG. 3 is performed iteratively and/or multiple times to continuously revise the model. For example, the process of FIG. 3 can be performed multiple times using different initial model weights generated at step 301. In some embodiments, the steps 301, 303, and 305 are performed multiple times using different initial model weights generated at step 301 before proceeding to step 307.

At 301, initial model weights are generated. For example, initial model weights are generated for a machine learning model to predict a normality score. In some embodiments, the model weights are randomly generated. When randomly generating the model weights, the process of FIG. 3 can be performed multiple times to create a more robust model.

At 303, a machine learning model is trained to predict a normality score. Using unlabeled input data, a machine learning model is trained to predict a single score that corresponds to how "normal" the operation is of the network computer environment. In various embodiments, the model is trained to predict scores that correspond to the normal operation of a specific network computer environment. Since each trained model is customized to a specific network computer environment, the scale and corresponding meaning for the predicted normality scores can differ between models. For example, for one customer network environment, a normality score that corresponds to the normal operation of the system can range between 0.001 and 0.004. For a different customer network environment, a normality score that corresponds to the normal operation of the system can range between 0.01 and 10.00.

At 305, an anomaly activation value is determined. Using the model trained at 303, an anomaly activation value is automatically determined. In various embodiments, the anomaly activation value is an activation threshold that is used to determine whether an anomaly has occurred. For example, a predicted normality score is compared to the determined anomaly activation value and in the event the predicted normality score exceeds the anomaly activation value, an anomaly is determined to have occurred. In various embodiments, the anomaly activation value is determined by creating a histogram of binned predicted normality scores using a time series of historical data. Based on the distribution of predicted normality scores, a peak can be identified that corresponds to the occurrence of anomalies and is used to set the anomaly activation value. In some embodiments, the anomaly activation value is set to a normality score slightly less than the score of the identified peak. For example, the anomaly activation value can be set to a normality score value slightly less than the score of the second peak using a configured offset value. In some embodiments, the offset value is an absolute, relative, percentage, or another form of an offset value. For example, a percentage offset such as 5% sets the threshold activation value to 95% of the peak value.

At 307, the model is refined, as appropriate. For example, the trained machine learning model and corresponding anomaly activation value can be utilized for further training and refinement of the model to improve model precision and accuracy if necessary. In some embodiments, the process of FIG. 3 is repeated using different initial weights. In some embodiments, the model is retrained using a data set with anomalies removed and/or retrained by predicting expected behavior and comparing the predictions with actual behavior. For example, the processes described with respect to FIGS. 7 and/or 8 can be performed to retrain the model to more accurately predict normality scores.

Figure 4:
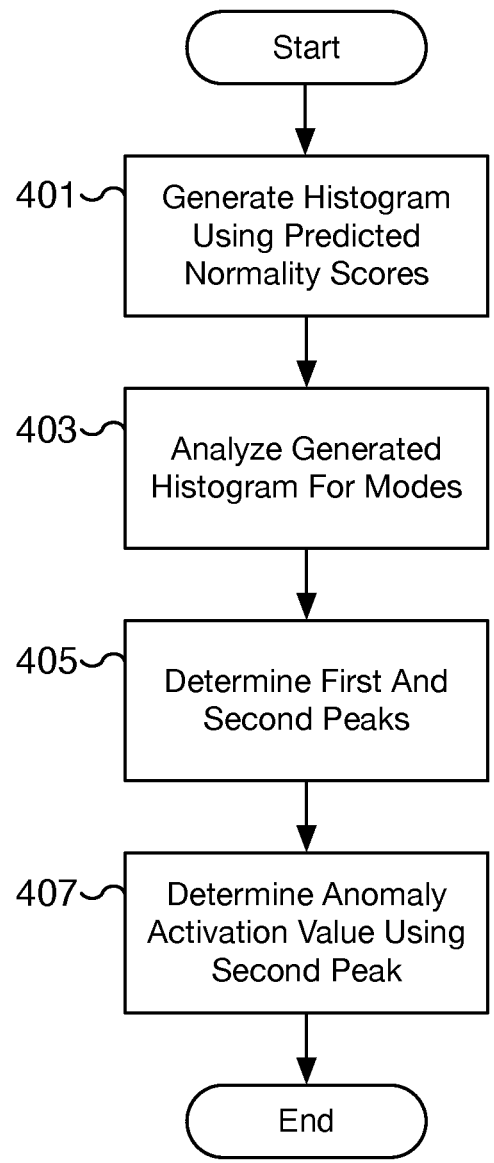
FIG. 4 is a flow chart illustrating an embodiment of a process for automatically determining an anomaly activation value for use in anomaly detection.

FIG. 4 is a flow chart illustrating an embodiment of a process for automatically determining an anomaly activation value for use in anomaly detection. For example, using the process of FIG. 4, an anomaly activation value is automatically determined and can be applied as a threshold activation value to identify anomalies for a network computer environment. The determined anomaly activation value is used with a trained model that predicts an associated normality score of the network computer environment. In some embodiments, the process of FIG. 4 is performed at 205 of FIG. 2 and/or at 305 of FIG. 3. In some embodiments, the machine learning model utilized by the process of FIG. 4 is trained using the processes of FIGS. 2 and/or 3. In some embodiments, the process of FIG. 4 is performed by machine learning service platform 107 of FIG. 1.

At 401, a histogram of predicted normality scores is generated. For example, using a dataset such as a training and/or validation dataset, normality scores are predicted and organized as a histogram by increasing normality score. In various embodiments, the predicted normality scores are binned into buckets of different normality score ranges. For example, in some embodiments, the histogram can utilize 100 different normality score bins that span the range of predicted normality scores. The leftmost normality values of the histogram represent and correspond to normal behavior and have the lowest normality scores. As the normality value increases to the right of the histogram, the predicted normality scores represent increasingly non-normal behavior. In various embodiments, the histogram of predicted normality scores for a network computer environment is multimodal and is at least bimodal, with the leftmost mode representing largely normal behavior.

At 403, the generated histogram is analyzed for modes. For example, the histogram of predicted normality scores is multimodal and includes multiple peaks corresponding to multiple modes where the different modes may have different (nonequal) values. In various embodiments, the different modes correspond to different local maxima (or peaks) of the histogram. As the peaks progress from lowest to highest corresponding normality values, the operating behavior associated with the peaks transitions from normal operating behavior to anomalous operating behavior. For example, the leftmost peak corresponds to largely normal operating behavior while each peak to the right of the leftmost peak corresponds to anomalous operating behavior. In some embodiments, the normal operating behavior of a network computer environment corresponds to a valid operating status of the network computer environment. In various embodiments, the histogram can be tested to determine whether it is multimodal using one of a variety of different techniques including a dip test, a bandwidth test, a mode existence test, evaluating kernel density, or another appropriate technique. In some embodiments, the second derivative of the histogram is calculated at various normality values to identify inflection points that correspond to transitions between different peaks (e.g., valleys or local minima) and the peaks (e.g., local maxima) themselves. In various embodiments, the analysis of the histogram includes identifying the different modes of the histogram including at least the two modes with the largest values and that correspond to the two largest peaks of the histogram.

At 405, the first and second peaks of the histogram are determined. For example, the first and second peaks corresponding to the two leftmost modes are identified. In various embodiments, the first peak is the leftmost peak and the second peak is the second leftmost peak. The second peak has a higher normality value than the first peak. Each of the two peaks corresponds to one of the modes of the multimodal histogram. The first peak and normality values centered near the first peak represent largely normal behavior. The second peak and normality values centered near the second peak and to the right of the second peak represent anomalies that should be detected.

At 407, an anomaly activation value is determined using the second peak. For example, an anomaly activation value is set based on the normality value of the second peak determined at 405. In various embodiments, the anomaly activation value is automatically determined and does not require an operator to supervise or provide additional input to the process. The determined anomaly activation value is the automatically determined threshold activation of the corresponding machine learning model utilized at 401 for predicting normal operating behavior. Predicted normality scores with a value that exceeds the anomaly activation value correspond to the occurrence of predicted anomalies for the network computer environment. In some embodiments, the anomaly activation value is set to either the normality score of the identified second peak or a value slightly less than the score of the identified second peak. For example, the anomaly activation value can be set to a normality score value slightly less than the score of the second peak using a configured offset value. In some embodiments, the offset value is an absolute, relative, percentage, or another form of an offset value. For example, a percentage offset such as 5% sets the anomaly activation value to 95% of the second peak's value.

Figure 5:
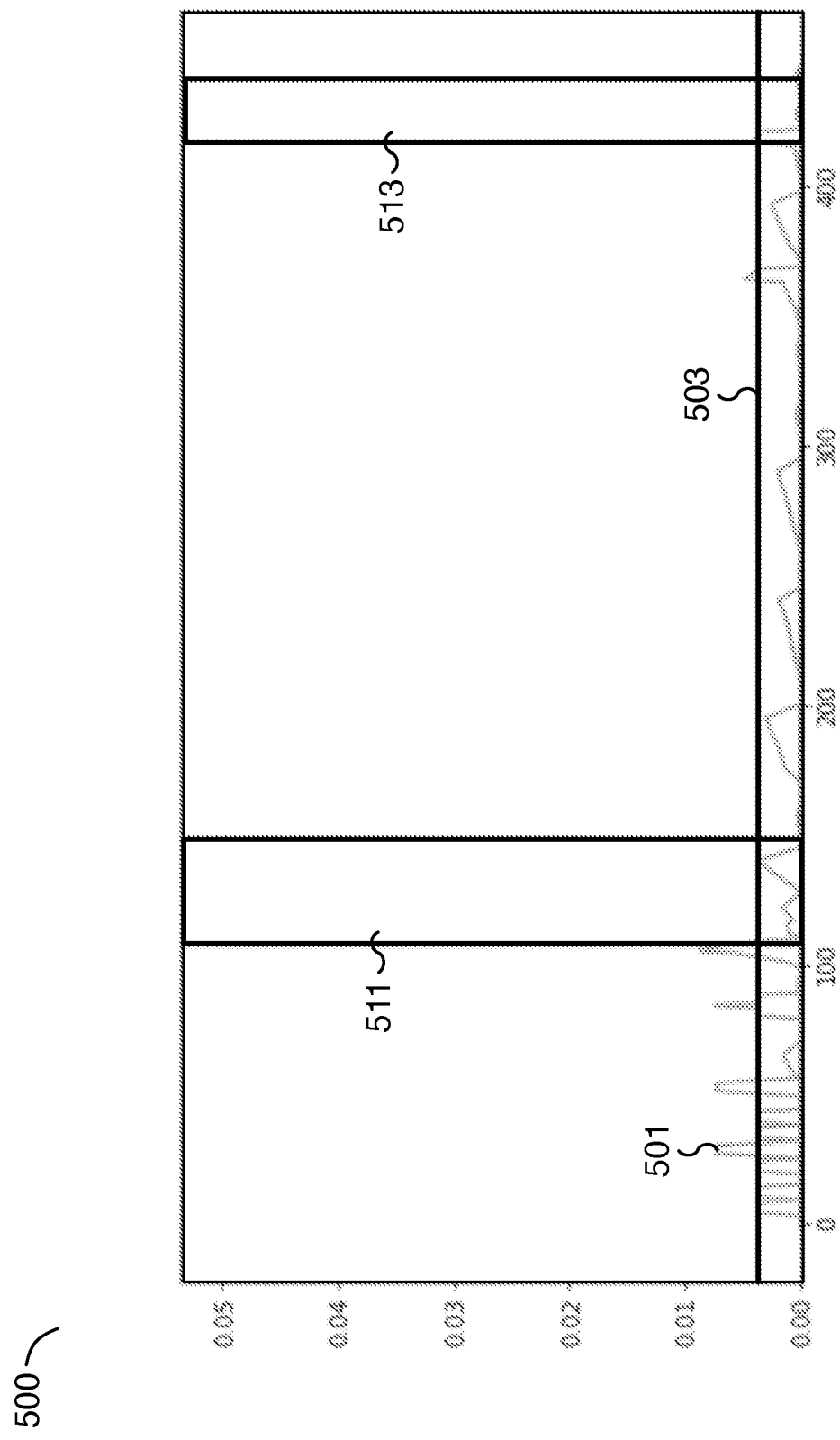
FIG. 5 is a diagram illustrating an example graph of predicted normality scores for a network computer environment.

FIG. 5 is a diagram illustrating an example graph of predicted normality scores for a network computer environment. In the example shown, the graph of FIG. 5 corresponds to a time series of normality scores predicted using a trained machine learning model. The predicted normality scores correspond to applying an input dataset gathered for a network computer environment. In some embodiments, the input dataset is a training or validation dataset used as part of the training process but could also correspond to a live production dataset. In some embodiments, the normality scores are predicted using machine learning service platform 107 of FIG. 1 for a network computer environment such as customer network environment 111 of FIG. 1. In some embodiments, the machine learning model is trained using the processes of FIGS. 2-4 and/or FIGS. 7-8.

In the example shown, time-series graph 500 displays predicted normality scores 501, anomaly activation value 503, and anomaly regions 511 and 513. The X-axis of time-series graph 500 corresponds to a relative time of operation for the network computer environment and starts at relative time 0. The Y-axis of time-series graph 500 corresponds to a normality value. Time-series graph 500 is scaled to show normality scores from 0.00 to approximately 0.05. In the example shown, predicted normality scores 501 represents predicted normality scores of a network computer environment based on provided input data of the network computer environment. In some embodiments, the input dataset corresponds to live production data captured in real-time and applied to the trained machine learning model to detect anomalies. In some embodiments, the input dataset corresponds to historical data and predicted normality scores 501 is used as part of the training process to refine the machine learning model.

In the example shown, anomaly activation value 503 is a horizontal line that corresponds roughly to a 0.0038 normality score. Portions of predicted normality scores 501 that exceed anomaly activation value 503 correspond to predicted anomalies. For example, anomaly regions 511 and 513 represent two labeled anomalies confirmed by an operator that occurred during the displayed time series. The area within an anomaly region corresponds to the time span of the anomaly. Each of anomaly regions 511 and 513 is preceded by a predicted normality score that exceeds anomaly activation value 503. In various embodiments, anomaly activation value 503 is automatically determined and is used to predict the occurrence of anomalies such as those corresponding to anomaly regions 511 and 513. Although only two anomaly regions 511 and 513 are labeled in time-series graph 500, each predicted normality score of predicted normality scores 501 that exceeds anomaly activation value 503 can trigger a detected anomaly. For example, applying anomaly activation value 503 to predicted normality scores 501 detects additional unlabeled anomalies in addition to the anomalies corresponding to anomaly regions 511 and 513. In various embodiments, the application of the anomaly activation value 503 to predicted normality scores 501 can detect the occurrence of anomalies that may go undetected by a human operator but that nevertheless are unexpected and/or undesirable responses for the network computer environment.

Figure 6:
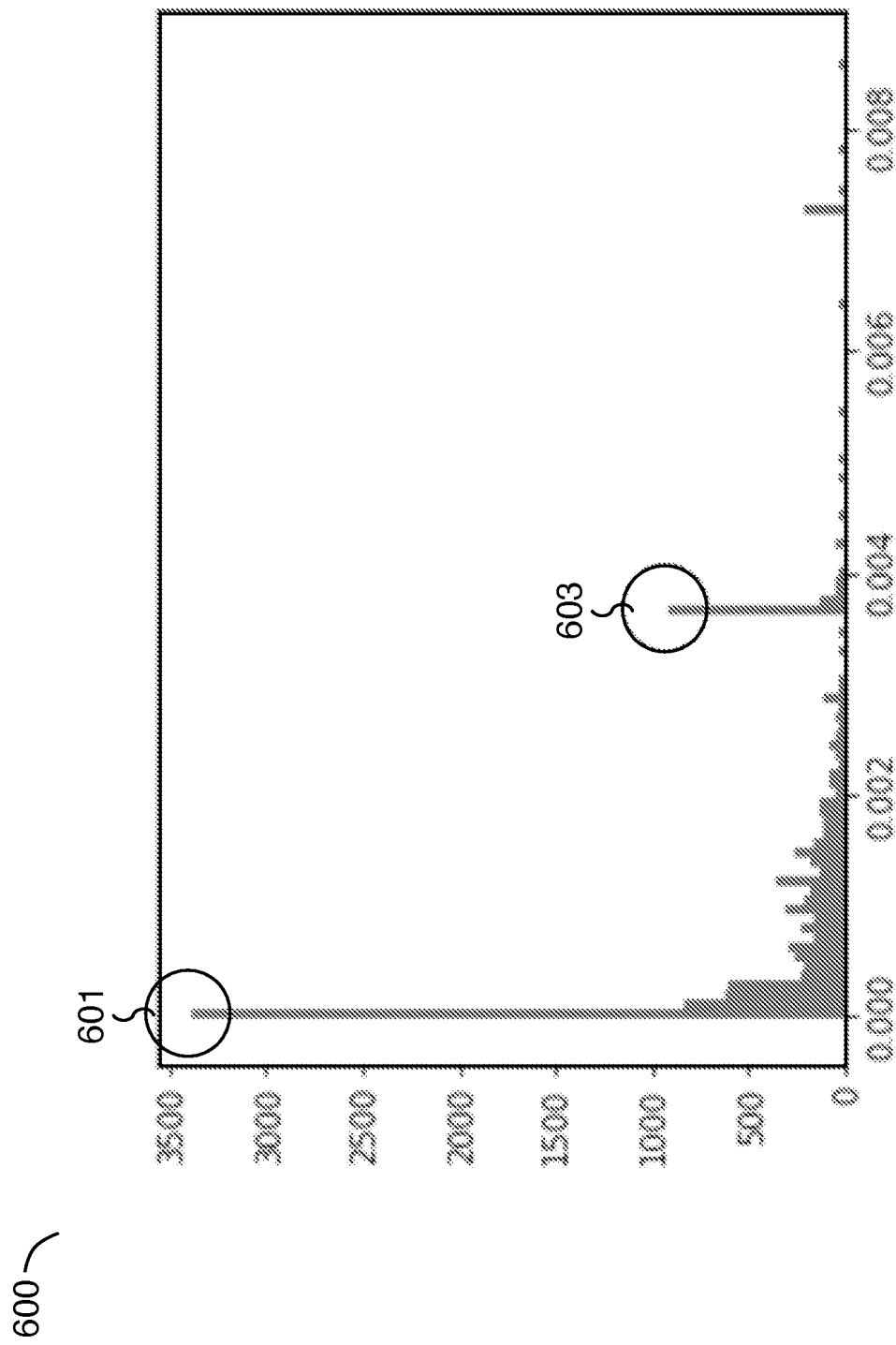
FIG. 6 is a diagram illustrating an example histogram of predicted normality scores for determining an anomaly activation value.

FIG. 6 is a diagram illustrating an example histogram of predicted normality scores for determining an anomaly activation value. In the example shown, histogram 600 corresponds to a time series of predicted normality scores for a network computer environment inferred using a trained machine learning model. In various embodiments, histogram 600 is generated and used to automatically determine a corresponding anomaly activation value for the trained model. The determined anomaly activation value is used along with the trained model to detect anomalies. For example, the occurrence of an anomaly is detected when a predicted normality score exceeds the corresponding anomaly activation value. In some embodiments, histogram 600 is generated and a corresponding anomaly activation value is determined by a machine learning service platform such as machine learning service platform 107 of FIG. 1 for a network computer environment such as customer network environment 111 of FIG. 1. In some embodiments, the normality scores shown in histogram 600 correspond to the normality scores of time-series graph 500 of FIG. 5 and the determined corresponding anomaly activation value is anomaly activation value 503 of FIG. 5. In some embodiments, the histogram 600 is generated and the corresponding anomaly activation value is determined using at least portions of the processes of FIGS. 2-4 and/or FIGS. 7-8.

In the example shown, histogram 600 includes predicted normality scores from left to right arranged in increasing value. The X-axis of histogram 600 corresponds to a normality score with a (leftmost) starting value of 0.000. The Y-axis of histogram 600 corresponds to the number of occurrences for each corresponding X-axis normality value. In the example shown, the predicted normality scores of histogram 600 have been binned and the vertical height of each bar at a particular normality score bin corresponds to the number of occurrences of that normality score for the corresponding bin. Histogram 600 is multimodal and the two largest modes correspond to first mode 601 and second mode 603. The corresponding count value for first mode 601 and second mode 603 are circled in histogram 600. First mode 601 has a normality score of 0.000 and a count of approximately 3400. Second mode 603 has a normality score slightly less than 0.004 and a count slightly less than 1000. First mode 601 and second mode 603 are the two most prominent modes of multimodal histogram 600. The normality scores surrounding first mode 601 correspond to normal operating behaviors for the network computer environment. In some embodiments, the normal operating behavior of a network computer environment corresponds to a valid operating status of the network computer environment and an operating performance that is within acceptable tolerances. For example, acceptable tolerances can include hardware resource usages such as memory, network, CPU, and GPU usages that are within acceptable tolerances and do not require operator intervention. In contrast, the normality scores surrounding and greater than second mode 603 correspond to anomalies for the network computer environment. First mode 601 corresponds to a first peak and second mode 603 corresponds to a second peak of histogram 600. In various embodiments, the anomaly activation value is determined based on second mode 603 and the second peak of histogram 600. In some embodiments, the anomaly activation value is set to a value slightly less than the normality score of second mode 603. For example, the anomaly activation value can be set to a normality score value slightly less than the score of the second peak using a configured offset value.

Figure 7:
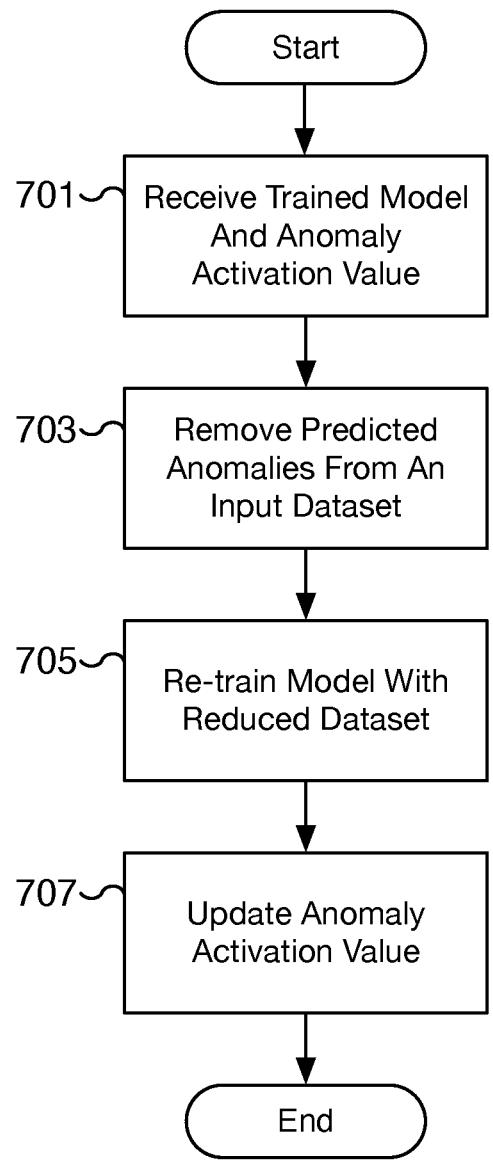
FIG. 7 is a flow chart illustrating an embodiment of a process for revising a trained machine learning model.

FIG. 7 is a flow chart illustrating an embodiment of a process for revising a trained machine learning model. For example, using the process of FIG. 7, a trained model and corresponding anomaly activation value is used to detect anomalies in an input dataset. The detected anomalies are removed from the input dataset to create a reduced dataset that is absent of the detected anomalies. The model is then retrained using the reduced dataset and, in some embodiments, a corresponding anomaly activation value is determined. In some embodiments, the process of FIG. 7 is performed at 205 of FIG. 2 and/or at 307 of FIG. 3. In some embodiments, the machine learning model and corresponding anomaly activation value utilized by the process of FIG. 7 are trained and determined using the processes of FIGS. 2-4. In some embodiments, the process of FIG. 7 is performed by machine learning service platform 107 of FIG. 1.

At 701, a trained model and corresponding anomaly activation value are received. For example, the machine learning model trained at 303 of FIG. 3 and the corresponding anomaly activation value determined at 305 of FIG. 3 are received and deployed on a machine learning inference platform. The machine learning inference platform is part of a machine learning service platform that includes one or more cloud-based inference servers. Once the model and corresponding anomaly activation value are deployed, the machine learning solution can be applied to an input dataset such as a training or validation dataset to predict normality behaviors and to detect the occurrence of anomalies.

At 703, predicted anomalies are removed from an input dataset. Using the model and anomaly activation value received and deployed at 701, an input dataset is evaluated to detect anomalies. In some embodiments, the input dataset is a training or validation dataset. For example, a validation dataset can be a subset of the training dataset that is set aside for additional training and refinement of the model. In various embodiments, the input dataset is prepared by gathering operating data of the network computer environment.

In some embodiments, the input dataset includes operating data covering at least a month long in duration. By ensuring the input dataset covers a sufficiently long enough time frame, the model can be evaluated with data that captures at least the monthly cyclical patterns of the network computer environment.

Once the anomalies are detected by applying the model to the input dataset, the input feature data corresponding to the detected anomalies are removed from the input dataset to create a reduced dataset. The reduced dataset is similar to the input dataset but does not contain the input feature data that corresponds to the occurrence of historical anomalies. When the reduced dataset is applied to the trained model, the predicted normality scores will not exceed the anomaly activation value and no anomalies will be detected. In various embodiments, the reduced dataset more closely mirrors the normal operating behavior of the network computer environment.

At 705, the model is retrained using the reduced dataset. For example, the machine learning model is retrained using the reduced dataset created at 703 that more closely mirrors the normal operating behavior of the network computer environment. By using the reduced dataset as input training data, the model is retrained to more accurately predict a normality score that matches the normal operating behavior of the network computer environment. In some embodiments, the retraining process is similar to and described with respect to the training process performed at 301 and/or 303 of FIG. 3. In some embodiments, the retraining process like the initial model training process includes multiple iterations to account for different initial weights.

At 707, the anomaly activation value is updated. In various embodiments, the anomaly activation value is updated to reflect the retrained model. Using the model retrained at 705, an updated anomaly activation value is automatically determined. In various embodiments, the process to automatically determine the anomaly activation value is similar to and described with respect to the step 305 of FIG. 3 and/or the process of FIG. 4 and involves generating a histogram of predicted normality scores using the retrained model. In some embodiments, the anomaly activation value applied to the retrained model is the same anomaly activation value used for the original model and no update is required.

Figure 8:
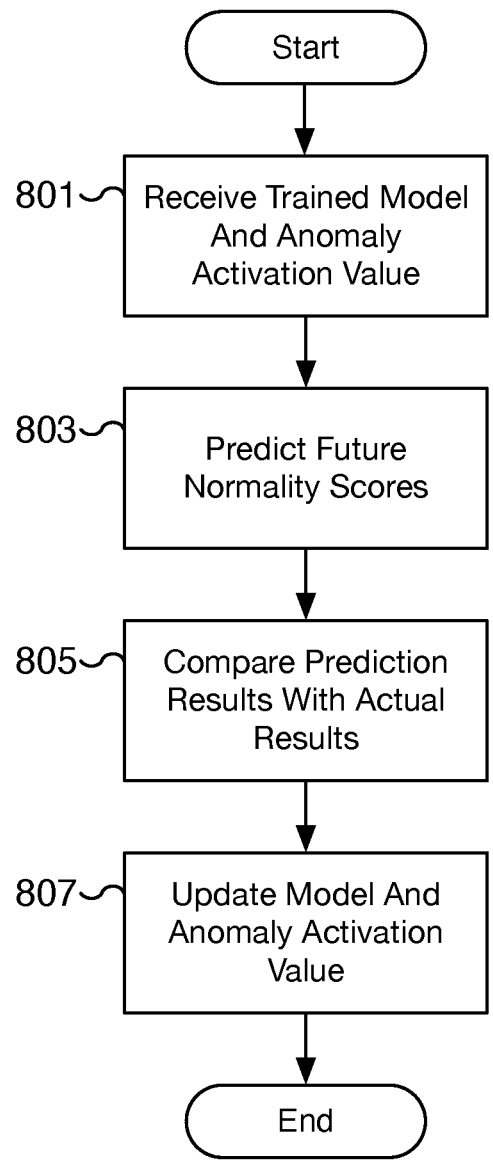
FIG. 8 is a flow chart illustrating an embodiment of a process for revising a trained machine learning model.

FIG. 8 is a flow chart illustrating an embodiment of a process for revising a trained machine learning model. For example, using the process of FIG. 8, a trained model and corresponding anomaly activation value are used to predict future normality scores and anomalies for an input dataset. The predicted values are compared to the actual values and the model and/or anomaly activation value is corrected based on the determined differences. In some embodiments, the process of FIG. 8 is performed at 205 of FIG. 2 and/or at 307 of FIG. 3. In some embodiments, the machine learning model and corresponding anomaly activation value utilized by the process of FIG. 8 are trained and determined using the processes of FIGS. 2-4. In some embodiments, the process of FIG. 8 is performed by machine learning service platform 107 of FIG. 1.

At 801, a trained model and corresponding anomaly activation value are received. For example, the machine learning model trained at 303 of FIG. 3 and the corresponding anomaly activation value determined at 305 of FIG. 3 are received and deployed on a machine learning inference platform. The machine learning inference platform is part of a machine learning service platform that includes one or more cloud-based inference servers. Once the model and corresponding anomaly activation value are deployed, the machine learning solution can be applied to an input dataset such as a training or validation dataset to predict normality behaviors and to detect the occurrence of anomalies.

At 803, future normality scores are predicted using the trained model. For example, using the model deployed to inference servers at 801, an input dataset is applied to the model and normality scores and anomalies are predicted. In some embodiments, the input dataset is a historical dataset that includes a time series of observed operating behavior including identified normal operating behavior and identified anomalies.

At 805, the predicted results are compared with actual results. For example, the results predicted at 803 using the input dataset are compared to the actual results for the network computer environment. In some embodiments, the input dataset is associated with corresponding actual operating behavior including normality scores. The predicted normality scores and anomalies are compared with the actual operating behavior which includes identified normal operating behavior and identified anomalies. By comparing the predicted results with the actual operating behavior of the network computer environment, the accuracy and precision of the model can be measured and improved.

At 807, the model and anomaly activation value are updated. In various embodiments, the machine learning model is updated using the comparison results determined at 805. Once updated, the updated model more accurately and more precisely predicts normal behavior for the network computer environment. In some embodiments, an updated anomaly activation value is automatically determined using the revised model. The process to automatically determine the anomaly activation value is similar to and described with respect to the step 305 of FIG. 3 and/or the process of FIG. 4 and involves generating a histogram of predicted normality scores using the updated model. In some embodiments, the anomaly activation value applied to the updated model is the same anomaly activation value used for the original model and no update is required.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    training a machine learning model for detecting anomalies using a training dataset, wherein the training dataset includes one or more network operations;
    applying the trained machine learning model to a validation dataset to determine anomaly detection results based on a normality score for each of the one or more network operations;
    generating a histogram reflective of the normality score for each of the one or more network operations included as part of the anomaly detection results of the machine learning model, wherein each of the normality scores of the one or more network operations reflects predicts occurrence of an anomaly with respect to normal operations;
    identifying, using one or more processors to automatically analyze the histogram, a first peak reflecting normal operations and a second peak predicts the occurrence of the anomaly;

determining a threshold activation corresponding to one or more network anomalies for the machine learning model based at least in part on the identified second peak of the histogram;

applying the trained machine learning model for detecting anomalies including the threshold activation to generate a predicted normality score for a network operation identified as an anomaly; and updating training of the trained machine learning model to reflect feedback associated with the anomaly identified based on the predicted normality score.

2. The method of claim 1, wherein a predicted score associated with the identified first peak of the histogram is associated with a valid operating status of a network computer environment.

3. The method of claim 1, wherein a predicted score associated with the identified second peak of the histogram is associated with an anomalous operating behavior of a network computer environment.

4. The method of claim 1, wherein a predicted score associated with the identified second peak of the histogram is less than a predicted score associated with the identified first peak of the histogram.

5. The method of claim 1, wherein the generated histogram is multimodal.

6. The method of claim 1, wherein the generated histogram has a first mode and a second mode, and wherein the first mode corresponds to the identified first peak of the histogram and the second mode corresponds to the identified second peak of the histogram.

7. The method of claim 1, wherein the training dataset includes unlabeled data.

8. The method of claim 1, wherein the training dataset includes operating data gathered for at least a month.

9. The method of claim 1, wherein the threshold activation of the machine learning model is set to a value less than a predicted score associated with the identified second peak of the histogram.

10. The method of claim 9, wherein the value less than the predicted score associated with the identified second peak of the histogram is based on a configured offset value.

11. The method of claim 10, wherein the configured offset value is configured using a percentage value.

12. A system, comprising:
one or more processors; and
a memory coupled to the one or more processors, wherein the memory is configured to provide the one or more processors with instructions which when executed cause the one or more processors to:
train, using a training dataset, a machine learning model for detecting anomalies, wherein the training dataset includes one or more network operations;
apply the trained machine learning model to a validation dataset to determine anomaly detection results based on a normality score for each of the one or more network operations;
generate a histogram reflective of the normality score for each of the one or more network operations included as part of the anomaly detection results of the machine learning model, wherein each of the normality scores of the one or more network operations reflects predicts occurrence of an anomaly with respect to normal operations;
analyze the histogram and automatically identify a first peak reflecting normal operations and a second peak predicts the occurrence of the anomaly; and determine a threshold activation corresponding to one or more network anomalies for the machine learning model based at least in part on the identified second peak of the histogram;

apply the trained machine learning model for detecting anomalies including the threshold activation to generate a predicted normality score for a network operation identified as an anomaly; and update the training of the trained machine learning model to reflect feedback associated with the anomaly identified based on the predicted normality score.

13. The system of claim 12, wherein a predicted score associated with the identified first peak of the histogram is associated with a valid operating status of a network computer environment.

14. The system of claim 12, wherein a predicted score associated with the identified second peak of the histogram is associated with an anomalous operating behavior of a network computer environment.

15. The system of claim 12, wherein a predicted score associated with the identified second peak of the histogram is less than a predicted score associated with the identified first peak of the histogram.

16. The system of claim 12, wherein the generated histogram has a first mode and a second mode, and wherein the first mode corresponds to the identified first peak of the histogram and the second mode corresponds to the identified second peak of the histogram.

17. The system of claim 12, wherein the training dataset includes operating data gathered for at least a month.

18. The system of claim 12, wherein the threshold activation of the machine learning model is set to a value less than a predicted score associated with the identified second peak of the histogram.

19. A computer program product, the computer program product being embodied in a non-transitory computer readable storage medium and comprising computer instructions for:
training, using a training dataset, a machine learning model for detecting anomalies, wherein the training dataset includes one or more network operations;
applying the trained machine learning model to a validation dataset to determine anomaly detection results based on a normality score for each of the one or more network operations;
generating a histogram reflective of the normality score for each of the one or more network operations included as part of the anomaly detection results of the machine learning model, wherein each of the normality scores of the one or more network operations reflects predicts occurrence of an anomaly with respect to normal operations;
analyzing the histogram and automatically identifying a first peak reflecting normal operations and a second peak predicts the occurrence of the anomaly;
determining a threshold activation corresponding to one or more network anomalies for the machine learning model based at least in part on the identified second peak of the histogram;
apply the trained machine learning model for detecting anomalies including the threshold activation to generate a predicted normality score for a network operation identified as an anomaly; and update the training of the trained machine learning model to reflect feedback associated with the anomaly identified based on the predicted normality score.

\* \* \* \* \*